United States Patent [19]

Ozols

[11] Patent Number: 4,648,273

[45] Date of Patent: * Mar. 10, 1987

[54] FORCE RESPONSIVE DEVICE

[76] Inventor: Karlis V. Ozols, 44 Thorne Ave., Mount Kisco, N.Y. 10549

[*] Notice: The portion of the term of this patent subsequent to Jan. 26, 1999 has been disclaimed.

[21] Appl. No.: 737,149

[22] Filed: May 23, 1985

Related U.S. Application Data

[60] Division of Ser. No. 511,507, Jul. 6, 1983, Pat. No. 4,528,851, which is a continuation-in-part of Ser. No. 236,874, Feb. 23, 1981, abandoned, which is a division of Ser. No. 965,784, Dec. 1, 1978, Pat. No. 4,312,227, which is a division of Ser. No. 790,045, Apr. 22, 1977, Pat. No. 4,138,600.

[51] Int. Cl.[4] ............................................. G01P 15/08
[52] U.S. Cl. ........................... 73/516 LM; 250/231 R
[58] Field of Search ............ 73/515, 516 R, 516 LM, 73/517 R; 200/61.45 R, 61.47; 250/231 R; 310/329; 33/366

[56] References Cited

U.S. PATENT DOCUMENTS

| | | | |
|---|---|---|---|
| 2,605,094 | 7/1952 | Hancock | 73/516 LM |
| 3,084,557 | 4/1963 | von Ahlefeldt | 73/516 LM |
| 3,113,464 | 10/1963 | Shulman | 73/517 R |
| 3,141,084 | 7/1964 | Stromberg | 200/61.47 |
| 3,164,023 | 1/1965 | Holderer | 73/516 LM |
| 3,279,245 | 10/1966 | Golden | 73/516 R |
| 3,706,217 | 12/1972 | Slater et al. | 73/516 LM |
| 4,312,227 | 1/1982 | Ozols | 73/516 LM |

FOREIGN PATENT DOCUMENTS 171676 7/1965 U.S.S.R. ....................... 73/516 LM

Primary Examiner—Michael J. Tokar
Assistant Examiner—John E. Chapman, Jr.
Attorney, Agent, or Firm—Peter K. Kontler; Tobias Lewenstein

[57] ABSTRACT

A device is provided for detecting the influence of a gravitational forceon a body due to changes in a freefall state. The device includes a spherical housing, and a flow medium is contained in, and is adapted to travel about and undergo flow in the housing. Monitoring means are provided at preselected positions about the housing for sensing the presence or absence of medium at said positions.

11 Claims, 4 Drawing Figures

FORCE RESPONSIVE DEVICE

RELATED APPLICATIONS

This application is a division, of application Ser. No. 511,507, filed July 6, 1983, now U.S. Pat. No. 4,528,851, which is a continuation-in-part application of Ser. No. 236,874, filed Feb. 23, 1981, now abandoned; which is a divisional application of Ser. No. 965,784, filed Dec. 1, 1978, now U.S. Pat. No. 4,312,227; which is a divisional application of Ser. No. 790,045, filed Apr. 22, 1977, now U.S. Pat. No. 4,138,600.

BACKGROUND OF THE INVENTION

This invention relates generally to a force-responsive device and more particularly, to a force-responsive device capable of measuring time intervals, and still more specifically to a device which is actuatable by changes in velocity, by gravity, by centrifugal force and/or other forces as will become apparent hereinafter.

The device, according to the present invention, may advantageously be integrated with an electrical switch and/or be connected to electrical signal-generating means.

Devices of the type disclosed herein are especially well suited for applications in rocketry and space-flight, but are not limited to such applications. They can be employed to control the acceleration of a rocket or missile, as well as in the programming of multi-stage firing and instrumentation. Devices known from the prior art for such applications are not satisfactory for reasons known to those skilled in the art, including their large size and weight, complexity of construction and, in many instances, lack of reliability.

There are a great number of commercial applications also. Another application of this device is that of a gravity-deceleration time fuze for smaller caliber field piece projectiles, including bazookas. It is particularly applicable for the ignition of the rocket fuel of a projectile in flight, i.e., after the initial ballistic firing of same.

SUMMARY OF THE INVENTION

It is an object of the invention to provide a force-responsive device which is simple both as to its operating principle and its construction.

A further object of the invention is to provide such a device which is highly reliable in operation.

A concomitant object is to provide a device which is light weight and requires relatively little space, two considerations which are of particular importance in the application of the novel device for rocketry and space flight applications where both weight and space are at a premium.

Still another object of the invention is to provide such a device which, while not limited thereto, is of particular advantage in rocketry and space-flight programming, staging and instrumentation.

In keeping with these objects and with others which will become apparent hereafter, one feature of the present invention resides in an inertia-responsive device for use with a movable body, e.g., such as a single-stage or multi-stage rocket, which is capable of acceleration and/or deceleration. The novel device may comprise container means (e.g., of electrically insulating material, such as synthetic plastic or glass) forming at least one compartment.

A quantity of flowable material will be accommodated in the container means and be adapted to travel about and flow in the compartment due to gravity and/or changes in the velocity of the device.

The material may be electrically conductive and cooperate directly (i.e., by physical contact) with electrical means (described below) used to monitor the position and/or flow of the material. Suitable materials include mercury, any amalgam thereof, finely divided metallic particles or graphite, or minerals or salts of substantially uniform size (preferably spherical) or the proper electrolyte, or combinations thereof. If the device is to be responsive to changes (e.g., appearance or disappearance) of a magnetic field, the material will be a paramagnetic and/or ferromagnetic or diamagnetic material, or magnetic fluid.

Electrical or other means are associated with the compartment for monitoring the position and/or flow of the material in the container means. The electrical means may constitute switch means or signal-generating means or be connected to the latter.

The foregoing and other objects of the present invention will become fully apparent from the following description of some currently preferred embodiments of the invention, which should be read in conjunction with the accompanying drawing but should be understood to be exemplary only.

DESCRIPTION OF PREFERRED EMBODIMENTS

Figure 1:
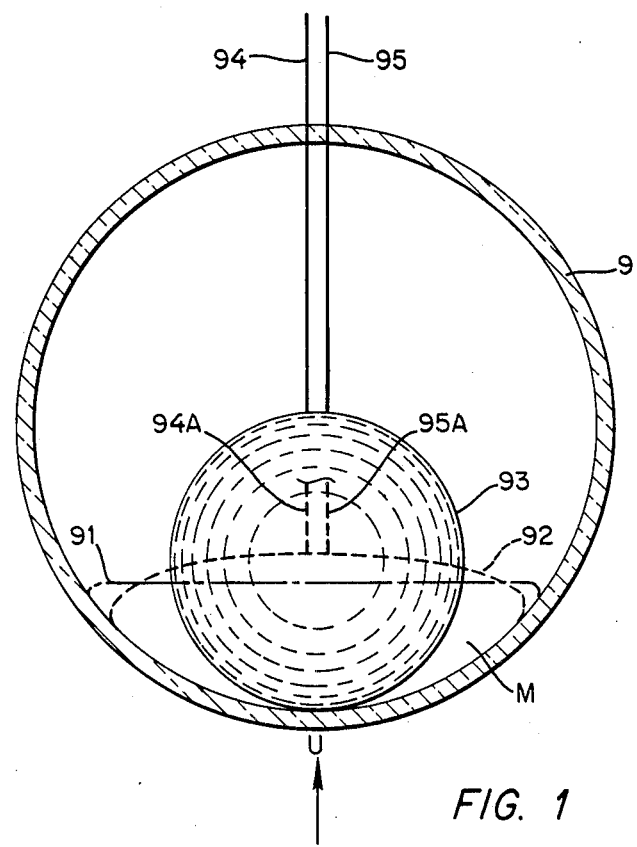
FIG. 1 is a diagrammatic elevational view showing one embodiment of the invention.

Referring to FIG. 1, a spherical, optionally gas evacuated housing is designated with reference numeral 90 and contains body M of flowable medium. Under steady state conditions the surface of the body M is the one indicated as 91. The device of FIG. 1 is intended to detect the instant at which zero gravity (i.e., from free fall) commences and terminates. For this purpose it makes use of the surface tension of the medium M, i.e., the phenomenon that under zero gravity the surface tension of the medium will cause it to form into a globule, i.e., a spherical body 93.

When in steady state, e.g., subject to acceleration in the direction of the arrow U, the surface configuration 91 will obtain for the medium M. As a change in steady state occurs, e.g., as zero gravity condition approaches, the medium M will be influenced thereby and the surface 91 will change to the surface configuration 92. Two electrodes 94 and 95 extend through the housing 90 in suitable electrically insulated relationship. If it is desired to detect the approach of zero gravity, the ends of these electrodes could be located as at 94A, 95A, i.e., in such a manner that an electrical circuit will be closed across them when the ends 94A, 95A are contacted by the surface 92 of the conductive medium M. Of course, the electrodes 94, 95 may be mounted to be shiftable (or otherwise adjustable) lengthwise of themselves relative to the housing 90, so that their ends can be selectively placed into the positions indicated at 94A, 95A and/or to other positions closer to or farther from the surface configuration 91.

At the moment zero gravity occurs, the surface tension of the medium M will cause the same to contract into the shape of a spherical body 93. If the ends of the electrodes 94, 95 are so positioned (see the solid-line showing in FIG. 9) that they are just contacted by the surface of the newly-formed body 93—whose diameter can of course be precalculated, preferably half of the inside diameter of the spherical housing—then the circuit across the electrodes 94, 95 will be completed the moment free fall or zero gravity occurs and, hence, this will be an instantaneous indication that free fall has commenced. Conversely, of course, at the moment free fall terminates (i.e., some degree of gravitational force returns or a change of velocity or of the direction occurs) the spherical body 93 will begin to flatten out (and eventually return to the surface configuration 91); as this flattening-out begins, the surface of body 93 will recede from contact with the ends of the electrodes 94, 95 and the circuit across the electrodes will be interrupted, providing substantially instantaneous indication that free fall is terminated.

Figure 2:
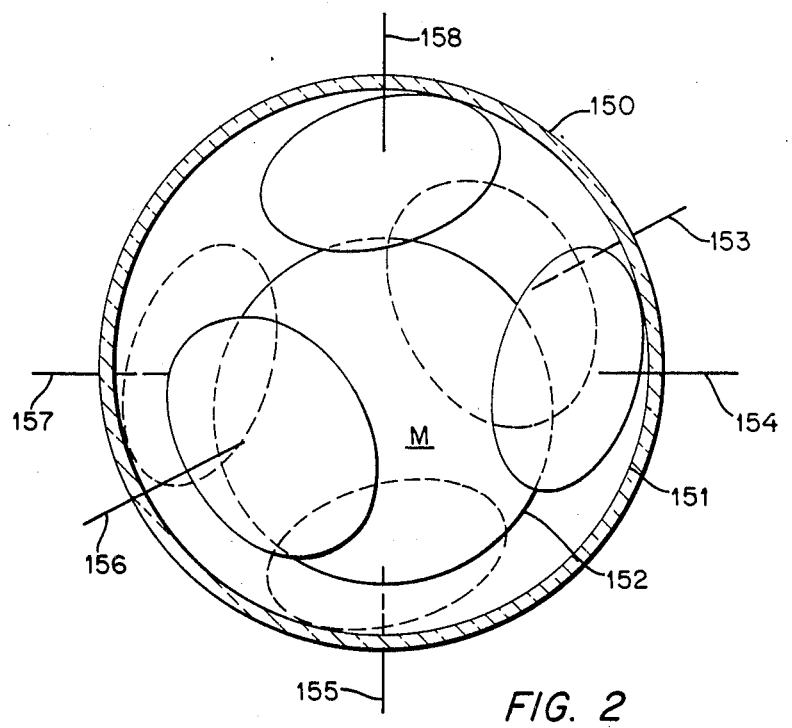
FIG. 2 is a side elevation, in diagrammatic form, of another embodiment of the invention.

The embodiment of FIG. 2 makes use of the same phenomenon as in FIG. 1 except that here the spherical housing is identified with numeral 150. Its interior 151 accommodates a body M of the flowable medium which under the influence of zero gravity again assumes spherical shape. The interior 151 is large enough to permit the sphere M, whose surface is indicated at 152, to float in the housing 150.

The spherical housing 150 is provided with six sensor plates of electrically conductive material oriented on three coordinate axes which are orthogonal to each other as shown; each of these plates is connected to an electrode (i.e., electrical conductor) 153–158, respectively. The remainder of the electrical circuit is not shown in any of the FIGURES since it does not form part of the invention and can be of any of the various electrical circuits known per se. The space in interior 151 that is not occupied by the medium M may be evacuated and then filled with a suitable gas or fluid like a magnetic liquid of greater buoyancy than the medium M; the purpose of this gas or fluid would be to dampen the oscillations of the medium M under free-fall conditions and/or such fluid may also serve as an electrolyte and/or as an electrically non-conductive substance, or for magnetic field detection.

When changes in the free-fall state occur, i.e., when the body in or on which the device of FIG. 2 is installed becomes subject to some gravity (e.g., due to acceleration or, in interplanetary space, due to the body entering the gravitational field of a celestial body) the spherical mass M will move relative to the sides of the housing 150, i.e., it will approach one side or set of sides and recede from the other. This will result in a change of capacitance in the circuit connected to the sensing plates via the electrodes 153–158 and will thus provide not only an indication that gravity is acting upon the device, but also in which direction the gravitational or magnetic pull or other forces are being exerted, and their magnitude; or that the vehicle is veering off course.

The basic embodiment of FIG. 2 may be modified to utilize radioactive emission proximity detection means by adding powdered radioelements or isotopes thereof to the mercury medium M.

Figure 3:
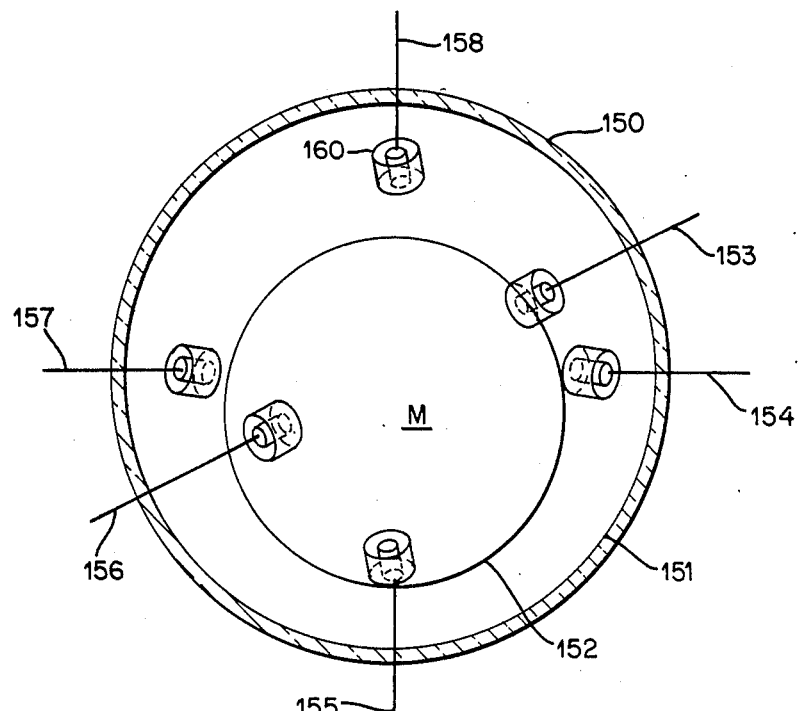
FIG. 3 is similar to FIG. 2 but illustrates an additional embodiment of the invention.
Figure 4:
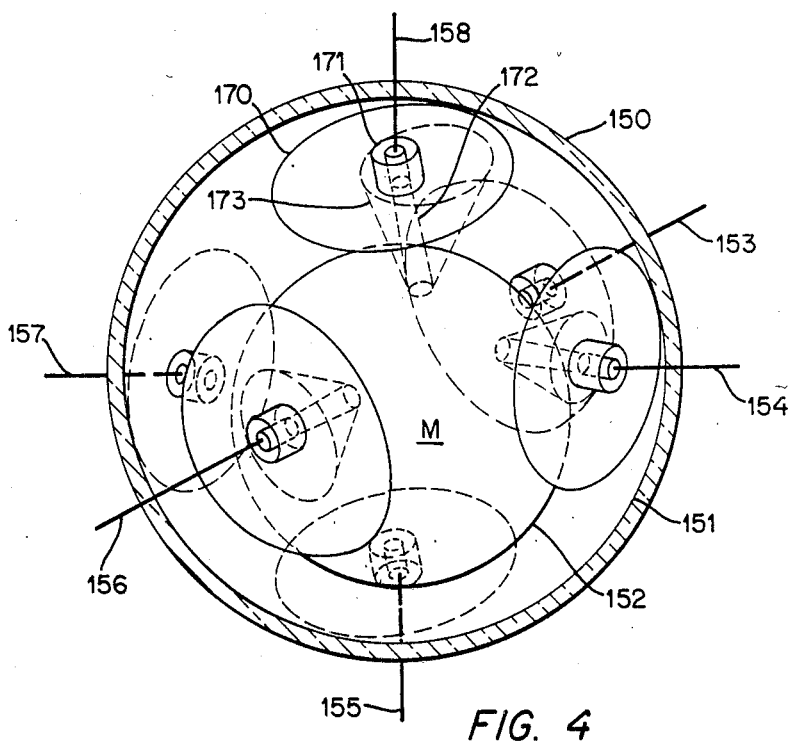
FIG. 4 is similar to FIG. 3 but shows a further embodiment of the invention.

The emission proximity detection means would be utilized with emission detectors 160 as shown in FIG. 3 instead of electrical capacitance detecting means.

The radioactive powders with a lower density than that of mercury would, due to buoyancy, float to the surrounding surface of the mercury medium and would be retained at equal distribution on the surface by the surface tension of the mercury. At the freezing temperature of mercury $-38.87°$ C., the radioactive substance powder particles would be solidified within the solid aggregate state spherical surface of the mercury medium M and still remain functional. The temperature in deep space approaches absolute zero, $-273.16°$ C.

The schematic embodiments of FIG. 2 are similar in every respect, except the phenomenon means for the detection of the proximity of medium M.

It is further possible in to register and detect movements and/or other displacements of the medium M via changes in resistivity of a circuit completed through the medium M.

A device according to the invention has a large number of uses, some of which have been outlined in the introductory part of this specification.

The flow rate and/or position of the material in the container can be monitored as a function of the variations in the electrical resistance of the material itself or across electrical contact elements (e.g., electrodes). It can also be monitored by electrical resistance variation through the compartment housing the material (FIG. 2), by requiring minimum sparking potential through such compartment, by sensing the optical shadow cast by the body of material on the surfaces of the compartment, and by optical reflection from the surface of the body of material (which surface changes as the body changes shape in response to variations in gravity, acceleration and the like).

As mentioned earlier, the device according to the invention has a wide range of useful applications. It can be employed for integration of gravitational and other forces over a period of time and to make or break electrical contacts. It has uses not only in military and space flight applications but also in commercial applications.

While the invention has been described and illustrated with particular reference to certain embodiments, it should be understood that this has been done only for the purpose of explaining the invention to those concerned with the art. No inference should be drawn that the invention is in any way limited to or by the illustrated embodiments, inasmuch as the scope of protection which it is sought to secure by United States Letters Patent is defined exclusively in the appended claims.

Wherefore, I claim:

1. A device adapted to detect the influence of a gravitational force on a body due to changes in a free-fall state, said device comprising:

a housing including a generally spherical center cavity;

a body of flow medium contained within said cavity, said body having a non-spherical shape in the presence of gravity, and said body being adapted to approach a spherical shape under the action of surface tension in response to an approach to zero gravity, said body further being free to move about said cavity as a function of changes in the free-fall state; and a plurality of monitoring means spaced about the wall of said cavity and connected to an external monitoring circuit, said monitoring means being adapted to monitor the movement of said body about said cavity in order to indicate the presence of a gravitational force acting upon the device and the direction in which the gravitational force is being exerted.

2. The device of claim 1 wherein said monitoring means includes a plurality of sensor plates of electrically conductive material.

3. The device of claim 2 wherein the plates are oriented on orthogonal coordinate axes and each of the plates is connected to an electrode.

4. The device of claim 1 wherein the cavity contains, in addition to the flow medium, a fluid having a greater buoyancy than the flow medium.

5. The device of claim 4 wherein said fluid is magnetic.

6. The device of claim 1 wherein at least one of said monitoring means comprises a light source and a cooperating light detecting element.

7. The device of claim 6 wherein said light detecting element comprises a photocell.

8. The device of claim 1 wherein said flow medium comprises a radioactive substance and at least one of said monitoring means includes a detector of radioactive emissions.

9. The device of claim 1 wherein at least one of said monitoring means comprises a detector for detecting optical reflections from said body.

10. The device of claim 1 wherein at least one of said monitoring means comprises a detector for detecting optical shadows of said body.

11. The device of claim 12 wherein said flow medium is electrically conductive.

* * * * *